April 15, 1930.  H. H. BOYCE  1,754,455

ILLUMINATION AND MAGNIFYING MEANS FOR MOTOR HEAT INDICATORS

Filed May 26, 1927

INVENTOR
HARRISON H. BOYCE
BY
ATTORNEYS

Patented Apr. 15, 1930

1,754,455

UNITED STATES PATENT OFFICE

HARRISON HURLBERT BOYCE, OF JERICHO, NEW YORK

ILLUMINATION AND MAGNIFYING MEANS FOR MOTOR HEAT INDICATORS

Application filed May 26, 1927. Serial No. 194,285.

This invention relates to devices for indicating the heat condition within the cooling systems of internal combustion engines and especially of automotive internal combustion engines.

One of the objects of this invention is to magnify a specific reading of the heat condition within an automotive radiator instead of magnifying a considerable range of indication of said heat condition to emphasize and arrest the driver's attention when a condition of danger arises.

Another object of this invention is to concentrate light rays upon the specific reading which it is desired to magnify.

Another object of this invention is to so position the magnifying means that its focal point coincides with the specific danger indication which it is desired to magnify.

Another object of this invention is to so place the light concentrating means that the maximum amount of light will be concentrated on the indication which is to be magnified.

Another object of the invention is to provide a magnifying and light concentrating means for the danger zone of a motor heat indicator which will receive and gather light from outside sources, such as street lamps, oncoming headlights etc., and concentrate the same on the danger zone of the heat indicator to make a danger condition readily observable at night and to emit light rays in a manner which will arrest the driver's attention when a danger condition is registered.

Other objects and advantages will be apparent from the following specification, claims and appended drawings, in which:

Figure 1:
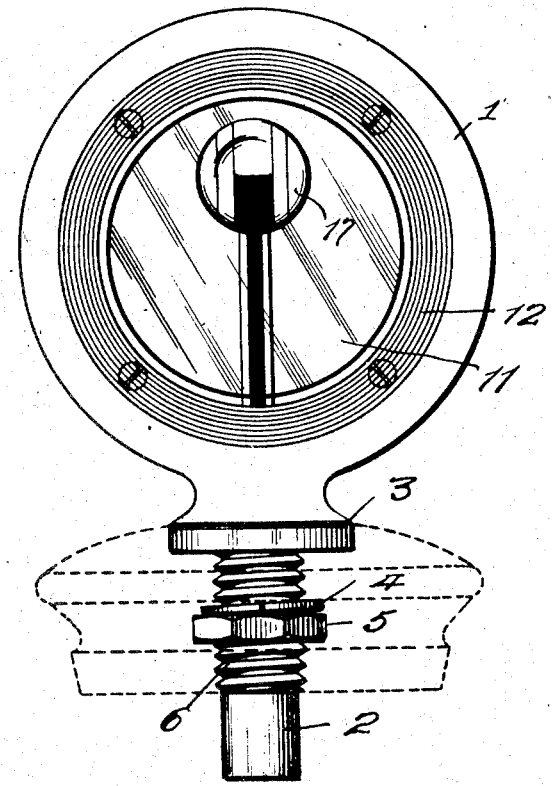
Fig. 1 is a front elevational view of my device.

My present invention is quite similar in several respects to that shown in my copending application Serial No. 179,201 filed March 29, 1927.

As is clearly shown in the drawings, my device consists of the usual casing 1 having a hollow stem 2 formed integral therewith. A base flange 3 is formed integral with the upper end of the stem 2 and the lower part of the casing 1. The stem 2 is adapted to pass thru an aperture in an automotive radiator cap or closure device (shown in dotted lines in the drawings) and to be secured in place thereon with the base flange 3 resting against the outer surface of the cap by a lock washer 4 and nut 5 cooperating with a threaded portion 6 of the hollow stem 2.

It is obvious that the major portion of the hollow stem 2 will project within the space above the water in the automotive radiator. In this portion of the hollow stem 2, I have mounted a heat responsive device 7 having an indicating element 8 extending across the casing 1. The upper end of this indicating element is received in an aperture 9 in the casing 1 and secured in place therein by heat insulating material 10.

The front of the casing 1 is closed by the bezel 11 retained in place by a retaining ring 12. If desired, a gasket may be provided between the bezel 11 and the casing 1. The rear side of the casing 1 is closed by a bezel 13 held in place on the casing 1 by a retaining ring 14. A dial 15 is positioned between the bezel 13 and the casing 1. This dial 15 may be provided with graduations adjacent the indicating element 8 to indicate the various heat conditions within the automotive radiator in the usual customary manner. If desired a gasket may be provided between the bezel 13 and the dial 15.

The dial 15 is provided with an aperture 16 adjacent that portion of the indicating element 8 of the heat responsive device 7 which corresponds to the indication of a dangerous heat condition within the automotive radiator to which my device is attached.

Figure 2:
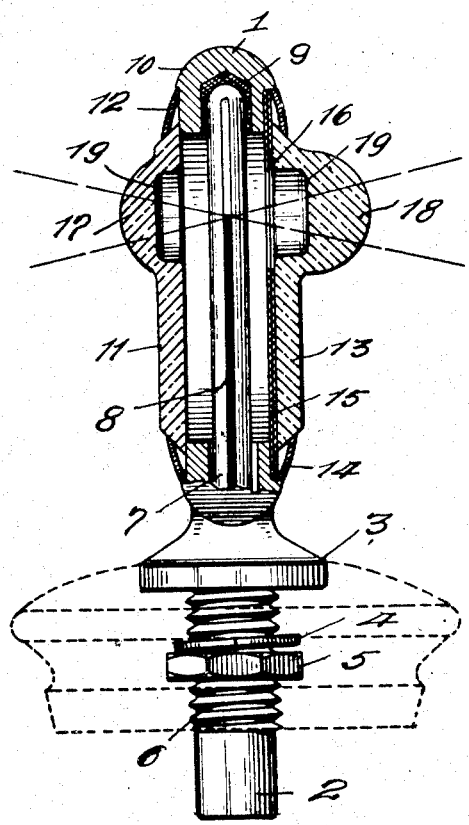
Fig. 2 is a side elevation of my device partly in section to more clearly illustrate my invention.
Figure 3:
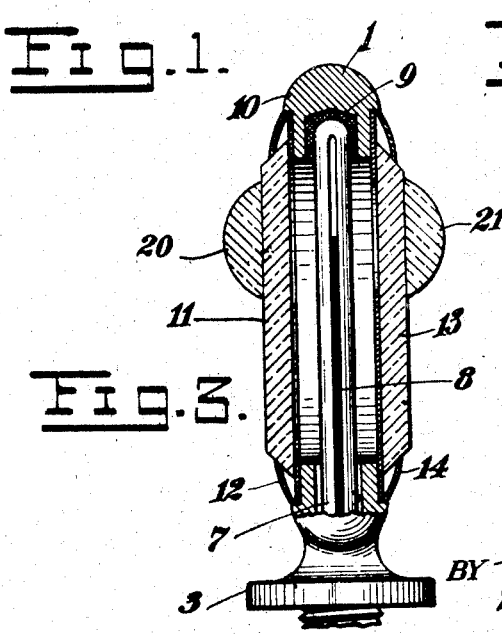
Fig. 3 is a similar view to Fig. 2 of a modified form of my invention.

The front bezel 11 is provided with a magnifying portion 17 lying directly in front of the aperture 16 in the rear bezel 15. This magnifying portion is of substantially the same extent as the aperture 16 and may be formed integral with the front bezel 11, as shown in Fig. 2, or affixed thereto in any suitable manner, as shown in Fig. 3. The curvature and positioning of this magnifying portion is such that the focal point thereof lies on or adjacent that portion of the indicating element 8 which corresponds to the approach of a dangerous heat condition within the automotive radiator to which my device is attached. The exact positioning of the focal point of the lens depends upon the magnifying result which it is desired to obtain The rear bezel 13 is provided with a light concentrating lens 18 covering that portion of the rear bezel 13 which lies directly to the rear of the aperture 16 in the rear dial 15. The curvature and positioning of this light concentrating lens 18 is such that the focal point of light rays passing through said lens will lie on or adjacent the portion of the indicating element 8 corresponding to a dangerous heat condition within the automotive radiator. If desired, the focal point of the lens 18 may coincide with the focal point of the lens 17, however, I do not desire to limit myself to such a coincidence of the focal points of the lens.

In order to reduce the distance of light travel through the magnifying lenses 17 and 18, I have provided recesses 19 extending from the inner sides of the respective bezels into the respective lenses. It is obvious that this feature increases the efficiency of the lens. The recesses 19 may be omitted if desired for the sake of cheapness of manufacture and rigidity of structure.

Referring to Fig. 2, it will be readily seen that the lens 18 will concentrate the light entering the same on a point of the indicating element 8 and that the said rays together with the indication at that point will be magnified by the magnifying lens 17. By this structure even a very weak light entering the lens 18 will be concentrated upon a small area of the indicating element 8 thus brightly illuminating this area. This brightly illuminated area is magnified by the lens 17 thus producing a readily readable indication even in weak light, which is quite pronounced in night driving.

In the drawings, I have shown the heat responsive element 7 as having a colored indicating liquid. At such times as the indicating liquid is in the area magnified by the lens 17, the light rays from the lens 18 magnified by the lens 17 will be colored the color of the indicating liquid. At other times the light rays will be uncolored.

My placing the light gathering lens 18 so that its focal point is substantially on the indicating element 8 at the point of indication of a dangerous heat condition within the automotive radiator, this point of indicating is greatly accentuated. A further accentuation is obtained by the coloring of the light rays by their passage thru the colored indicating liquid when the same enters this indicating range. A still further accentuation is obtained by the use of the lens 17 to magnify the reading of the indicating element at the point of light concentration by the lens 18 and to disperse the light rays concentrated by the said lens 18.

In night driving, light rays from in front of the vehicle upon which my device is mounted will be concentrated by the lens 18 and appear as a small brilliantly illuminated area on the indicating element 8. This area will, of course, be magnified by the lens 17 and produce an easily readable indication. The light rays concentrated by the lens 18 may emanate from the lights of passing vehicles, the lights of the vehicle upon which my device is mounted, street lights, or from any other source.

In day or night driving, the approach of a dangerous condition is immediately indicated by a change of color of the lens 17 which, due to the play of light passing through the lens 18 as the vehicle moves, arrests and concentrates the driver's attention, making it substantially impossible to ignore the danger indication.

Fig. 3 shows my invention applied to a heat indicator of conventional design, by securing to the front and rear bezels thereof magnifying lenses 20 and 21, of approximately the size of the aperture 16 and of a focal length which will secure the desired concentration of light on the tube 8.

It will be appreciated that when the indicating fluid enters the zone magnified by the lenses 17 or 20, the reading of the fluid column is not only magnified in width, as illustrated in Fig. 1, but is also magnified in length. For each fraction of an inch of rise of the fluid column within the danger zone, there is an apparent rise of two or three times the actual rise indicated by the lenses 17 or 20 which gives the effect of a sudden jump of the indication within the danger zone, the suddenness of which will arrest the driver's attention and cause him to investigate the cause thereof.

Various changes in the construction of the embodiment illustrated in the drawings may be made without departing from the spirit of the invention, and I do not therefore desire to limit myself to the specific construction shown and described but to interpret the invention broadly within the scope of the appended claims.

What I claim as my invention is:

1. In a device for indicating the heat condition within an automotive radiator, an indicating device having an indicating element, lens means for concentrating light rays upon a portion only of said indicating element, and lens means for magnifying said concentrated light rays whereby the indication of said portion is accentuated over other portions of the indicating element.

2. In a device for indicating the heat condition within an automotive radiator, a device responsive to changes in heat condition within said radiator and having an indicating element, a light gathering lens having its focal point substantially on a portion only of said indicating element, and a magnifying lens having its focal point substantially coinciding with the focal point of the light gathering lens.

3. In a device for indicating the heat condition within an automotive radiator, a device responsive to changes in heat condition within said radiator and having an indicating element, said indicating element being transparent, and a light-gathering lens having its focal point substantially on that portion only of said indicating element corresponding to a dangerous heat condition within said radiator.

4. In a device for indicating the heat condition within an automotive radiator, a device responsive to changes in heat condition within said radiator and having an indicating element, a light-gathering lens having its focal point substantially on that portion only of said indicating element corresponding to a dangerous heat condition within said radiator, and a magnifying lens having its focal point substantially coinciding with the focal point of the light-gathering lens, whereby the illumination of said point will be increased and the indication of the illuminated point magnified.

5. In a device for indicating the heat condition within an automotive radiator, a light-gathering lens, and a magnifying lens so positioned that their focal points substantially coincide on a portion only of said device.

6. In a device for indicating the heat condition within an automotive radiator, a casing, a front and a rear bezel for said casing, a magnifying lens on the front and a light gathering lens on the rear bezel, the focal length and positioning of said lenses being such that their focal points coincide within said casing, and an element responsive to changes in heat condition within said radiator having an indicating element within said casing, a portion only of which is adjacent the focal point of said lenses and intersecting the axis of at least one of said lenses.

7. In a device for indicating the heat condition within an automotive radiator, an indicating device having a tubular indicating element, means for concentrating light rays upon a portion only of said indicating element corresponding to the dangerous heat condition, and means for magnifying said concentrated light rays.

8. In a device for indicating the heat condition within an automotive cooling system, a heat-responsive element comprising a hollow stem, an indicating fluid therein, and lens means to magnify the stem within the range indicating the approach of a dangerous condition over other portions of said stem.

9. In a device for indicating the heat conditions in an automotive radiator, a casing, a front and rear bezel in said casing, an element responsive to changes in heat conditions within said radiator having an indicating device having a tubular indicating element within said casing and between said front and rear bezels and a magnifying lens on the front and a light gathering lens on the rear of said bezels, said lenses being adjacent that portion only of the indicating element which corresponds to a dangerous heat condition.

In testimony whereof I have affixed my signature to this specification.

HARRISON H. BOYCE.